Figure 1:
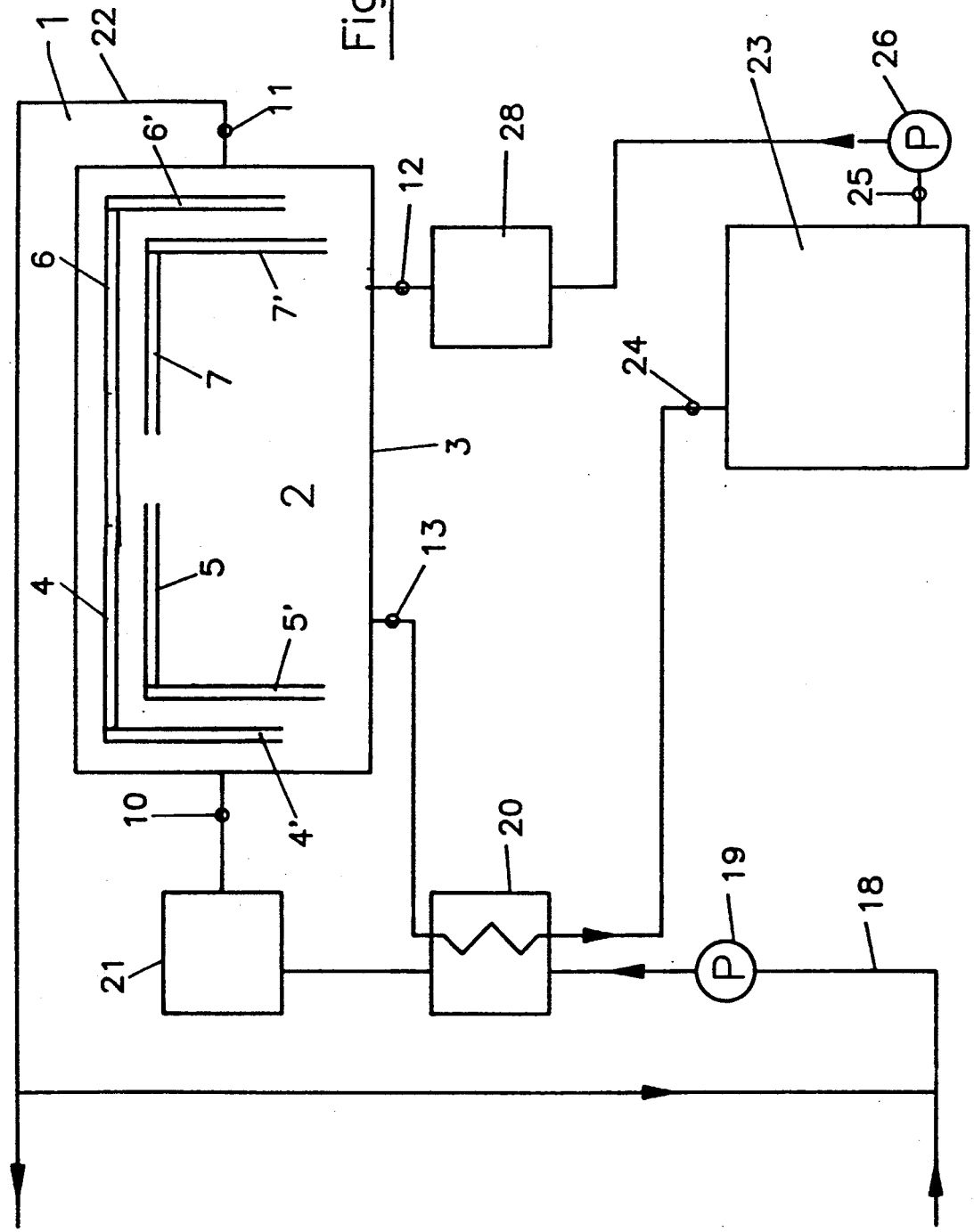

United States Patent [19]

Vielberth et al.

[11] Patent Number: 5,211,812

[45] Date of Patent: May 18, 1993

[54] DEVICE FOR THE RECOVERY OF A PROCESSED LIQUID IN THE FORM OF A CONDENSATE ON A LIQUID TO BE PROCESSED

[75] Inventors: Johann Vielberth, Regensburg; Eberhard Willach, Straubing, both of Fed. Rep. of Germany

[73] Assignee: Institut für Entwicklung und Forschung Dr. Vielberth KG, Fed. Rep. of Germany

[21] Appl. No.: 650,038

[22] Filed: Feb. 4, 1991

[30] Foreign Application Priority Data

Feb. 3, 1990 [DE] Fed. Rep. of Germany ....... 4003224
Mar. 14, 1990 [DE] Fed. Rep. of Germany ....... 4008066

[51] Int. Cl.⁵ ........................... B01D 1/22; B01D 3/10
[52] U.S. Cl. .................................. 202/172; 202/173; 202/185.2; 202/205; 202/236; 202/266; 202/267.1; 202/268; 159/13.1; 159/DIG. 28; 203/11; 203/72
[58] Field of Search ............... 202/236, 205, 268, 173, 202/172, 185.2, 266, 267.1; 203/72, 89, 11, 86; 159/13.1, 28.6, DIG. 28

[56] References Cited

U.S. PATENT DOCUMENTS

| | | | |
|---|---|---|---|
| 2,447,746 | 8/1948 | Ferris et al. | 203/89 |
| 2,514,943 | 7/1950 | Ferris et al. | 202/236 |
| 2,514,944 | 7/1950 | Ferris et al. | 203/89 |
| 3,214,348 | 10/1965 | Lichenstein | 202/236 |
| 3,214,350 | 10/1965 | Lichenstein | 202/236 |
| 3,214,351 | 10/1965 | Lichenstein | 202/236 |
| 3,795,388 | 3/1974 | Toth . | |
| 4,233,153 | 11/1980 | Hammel et al. . | |
| 4,475,988 | 10/1984 | Tsumura et al. | 202/236 |
| 4,517,057 | 5/1985 | Fauser et al. | 202/236 |
| 4,613,410 | 9/1986 | Rivers | 202/236 |
| 4,863,568 | 9/1989 | Wijn | 202/236 |

FOREIGN PATENT DOCUMENTS

| | | |
|---|---|---|
| 0066790 | 12/1982 | European Pat. Off. . |
| 0189610 | 8/1986 | European Pat. Off. . |
| 34117 | 2/1885 | Fed. Rep. of Germany . |
| 1178040 | 9/1964 | Fed. Rep. of Germany . |
| 3010042 | 11/1980 | Fed. Rep. of Germany . |
| 3600778 | 7/1987 | Fed. Rep. of Germany . |
| 817036 | 8/1937 | France . |
| 1031005 | 5/1966 | United Kingdom . |

Primary Examiner—Wilbur Bascomb, Jr.
Attorney, Agent, or Firm—Lucas & Just

[57] ABSTRACT

The invention relates to a device for the recovery of a processed liquid in the form of a condensate from a liquid to be processed by evaporation and condensation, having at least one first flow region which is provided in a working space for the development of a first sheetlike flow of the liquid to be processed and at least one condensing surface, adjacent to the first flow region and cooler in temperature than the first flow, for liquid evaporated at the first flow region.

The invention is characterized in that a second flow region is adjacent to the at least one first flow region in the common working space for the development of a sheetlike second flow, and in that the condensing surface is formed of the surface of the liquid of the at least one second flow region.

19 Claims, 10 Drawing Sheets

DEVICE FOR THE RECOVERY OF A PROCESSED LIQUID IN THE FORM OF A CONDENSATE ON A LIQUID TO BE PROCESSED

The present invention relates to a device for the evaporation and distillation of water to purify it. Water to be purified is passed over a wetted fabric. Purified water is poured over an adjacent wetted fabric. Since the water to be purified is at a higher temperature than the purified water, it evaporates and subsequently condenses on the purified water.

There is known a device especially for processing or distilling water (DE-A 30 10 042) wherein a plurality of primary sheetlike flow regions for the water to be distilled are developed, parallel and at a distance apart from one another, in the interior of a housing. Each primary flow region on one side directly adjoins a wall which on the outermost flow region forms a collecting surface heatable by solar radiation for heating the water to be processed in this flow region. The corresponding walls of the flow regions lying further inward in each instance serve as condensing surfaces which are cooled by the water to be processed. In this known device it is disadvantageous that it is limited exclusively to operation with solar energy and requires a relatively costly design. The latter is due merely to the necessity of walls or wall elements as condensing surfaces. Such condensing surfaces likewise have the disadvantage that, to prevent corrosion, they must be made of a corrosion-resistant material and that, in addition, dirt, germs (e.g., bacteria), etc. may be deposited on such wall elements.

In addition, there is known (GB-A 10 31 005) a device for processing sea water wherein, side by side in horizontal direction and superposed in vertical direction, a plurality of channels, open toward the top in each instance, is provided in the interior of a housing, in which channels the sea water or the processed water is carried essentially standing. The sea water to be processed is evaporated and condensed on the surface of the colder processed water. This known device requires a relatively great volume. Despite this, a sufficient output (quantity of sea water processed per unit of time) is not obtainable.

The object of the invention is to provide a device which avoids the aforementioned disadvantages and, with a simple design, likewise exhibits improved efficiency.

In the device pursuant to the invention, the condensing surface is likewise not formed of the surface of a wall element but, rather, directly of a free liquid surface, but of the liquid surface of a second liquid flow of the processed liquid at the second flow region in each instance. At the same time, the temperature of the liquid of the second flow of liquid is lower than the temperature of the liquid of the first flow of liquid.

The at least one first flow region and the at least one second flow region in each instance extend, adjacent to one another in the common working space without an intermediate separating wall, in vertical direction or in a direction which encloses an acute angle with the vertical, i.e., an angle at most equal to but preferably smaller than 45°. A curtainlike flow is thus formed at the flow region.

The flow regions which enclose the acute angle with the vertical are developed on a flow aid of hydrophilic or wettable material. By this is meant, within the meaning of the invention, a material which permits as homogeneous as possible a large sheetlike stream of liquid with a free liquid surface. Within the meaning of the invention, a hydrophilic or wettable material is therefore woven cloth, fibrous flat materials, nonwovens or, alternatively, mesh or screenlike materials or structures.

In the case of flow regions extending in vertical direction, these are preferably likewise formed of a flow aid of the hydrophilic material in each instance.

The at least essentially vertical arrangement of the flow regions directly side by side in the common working space makes it possible for the liquid vapor emerging at the first flow region (from the hotter stream of liquid there) to be precipitated as condensate directly on the cooler stream of liquid of the second flow region and carried along with this stream of liquid. Optimal operation and high efficiency are therefore obtainable in a device of small volume, specifically with exact separation of the respective phases or media, i.e., the liquid to be processed and the liquid processed. In particular, the flow aids of hydrophilic material likewise contribute decisively to improved separation of the individual phases of the medium and ensure large-area and uniform distribution of the liquid to be evaporated as well as of the condensate. The invention results in constant and optimal thermodynamic conditions with small circulation quantities, i.e., in particular including a uniform medium or heat-exchange surface.

With the same size or same dimensions of the device, the invention procures substantially greater surfaces for evaporation of the liquid to be processed and condensation of the processed liquid, especially also because each flow region is effective on both sides.

Figure 2:
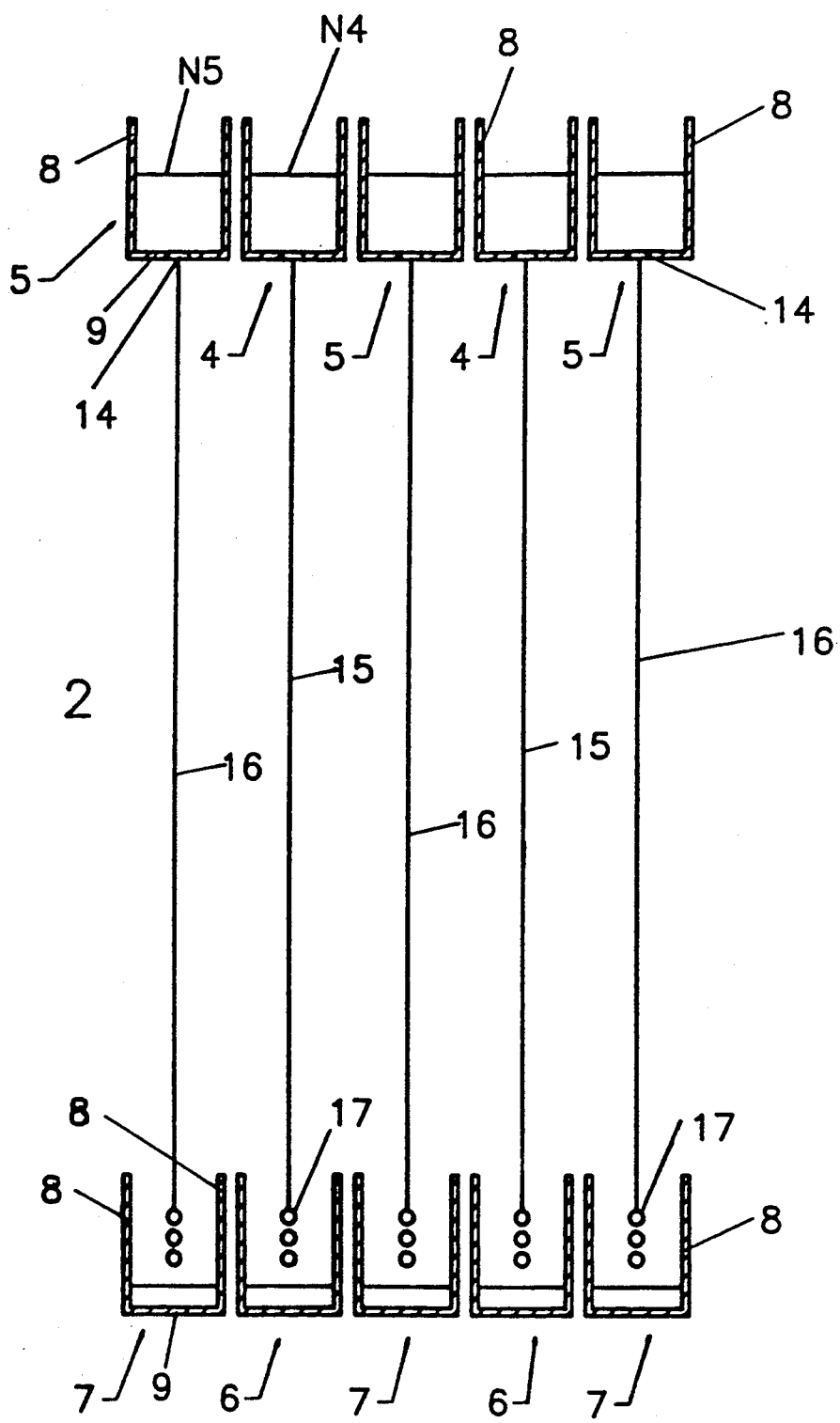
Figure 3:
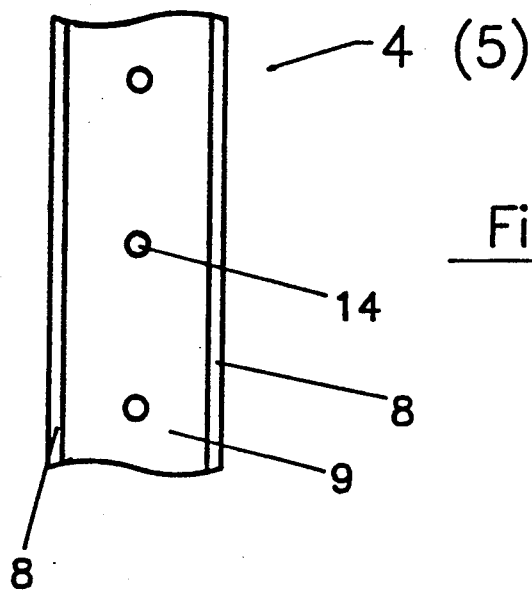
Figure 4:
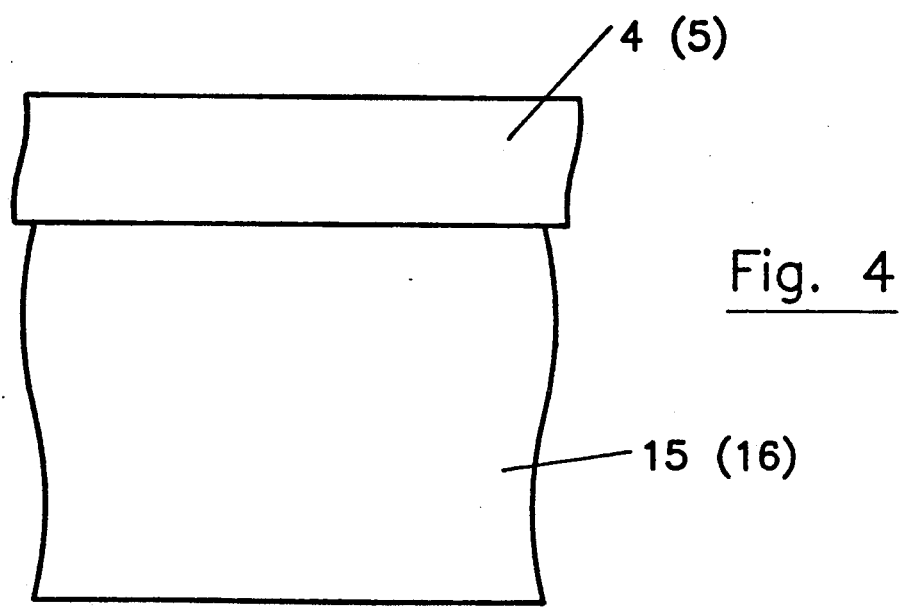
Figure 5:
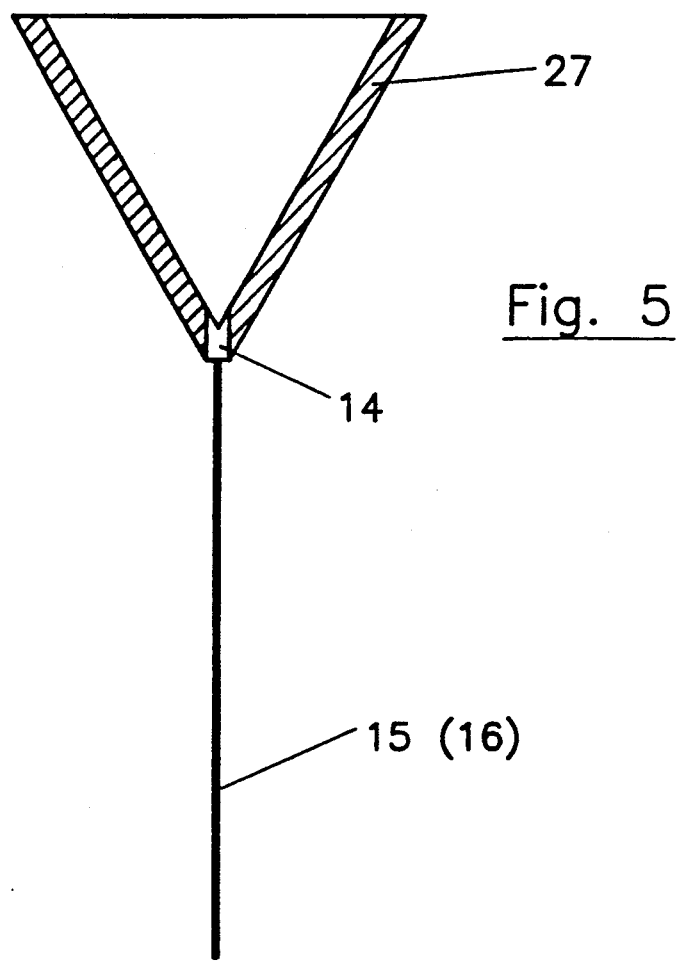
Figure 6:
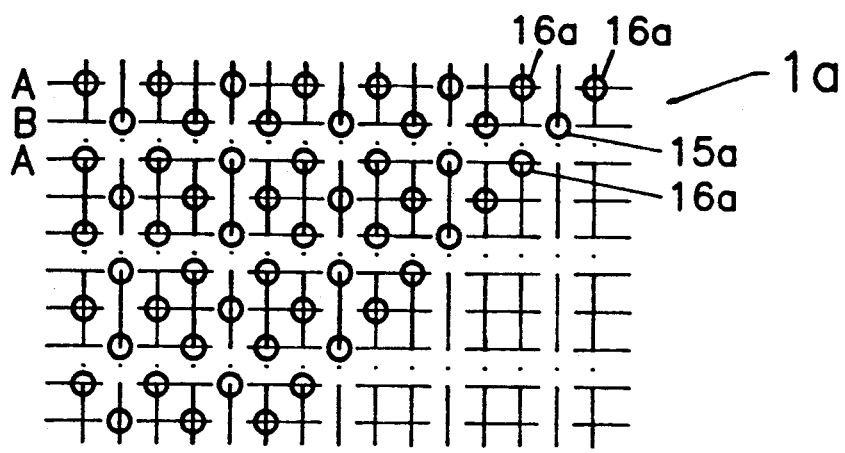
Figure 7:
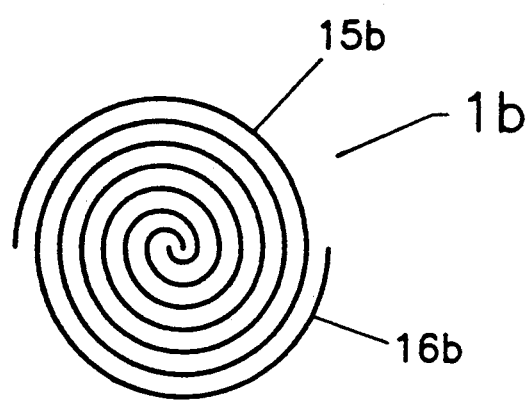
Figure 8:
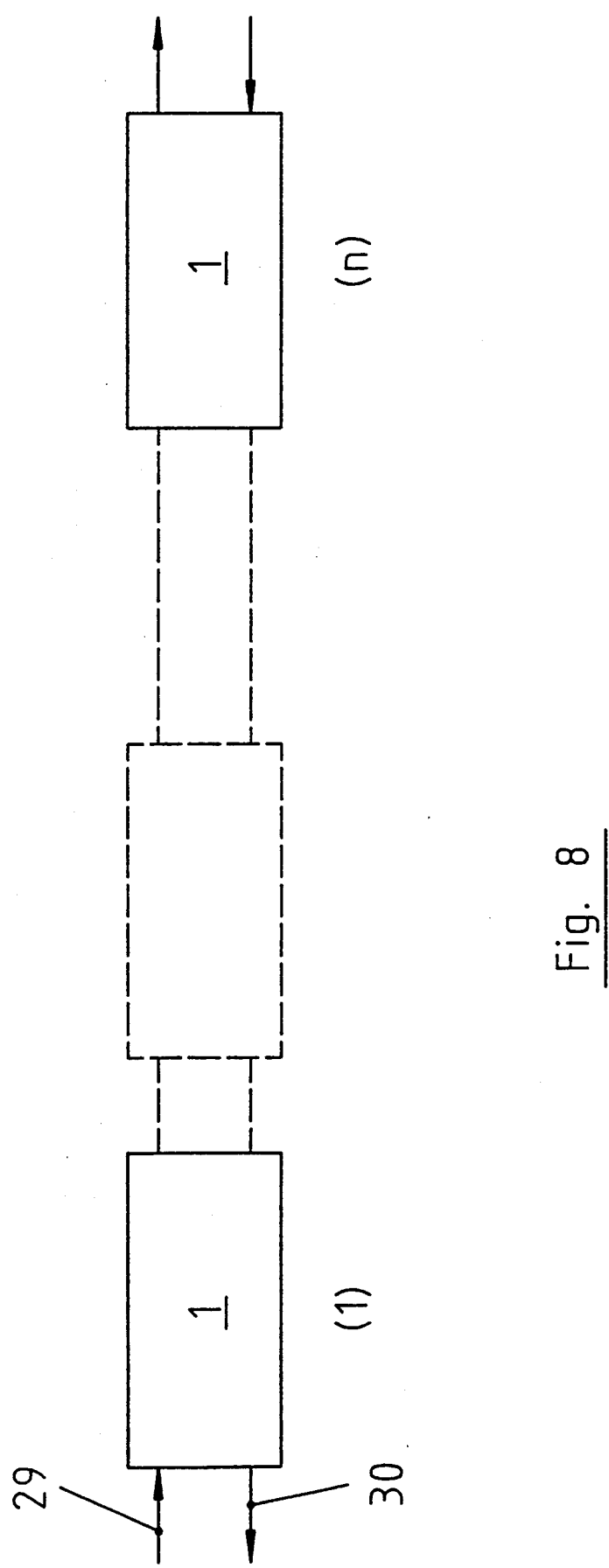
Figure 9:
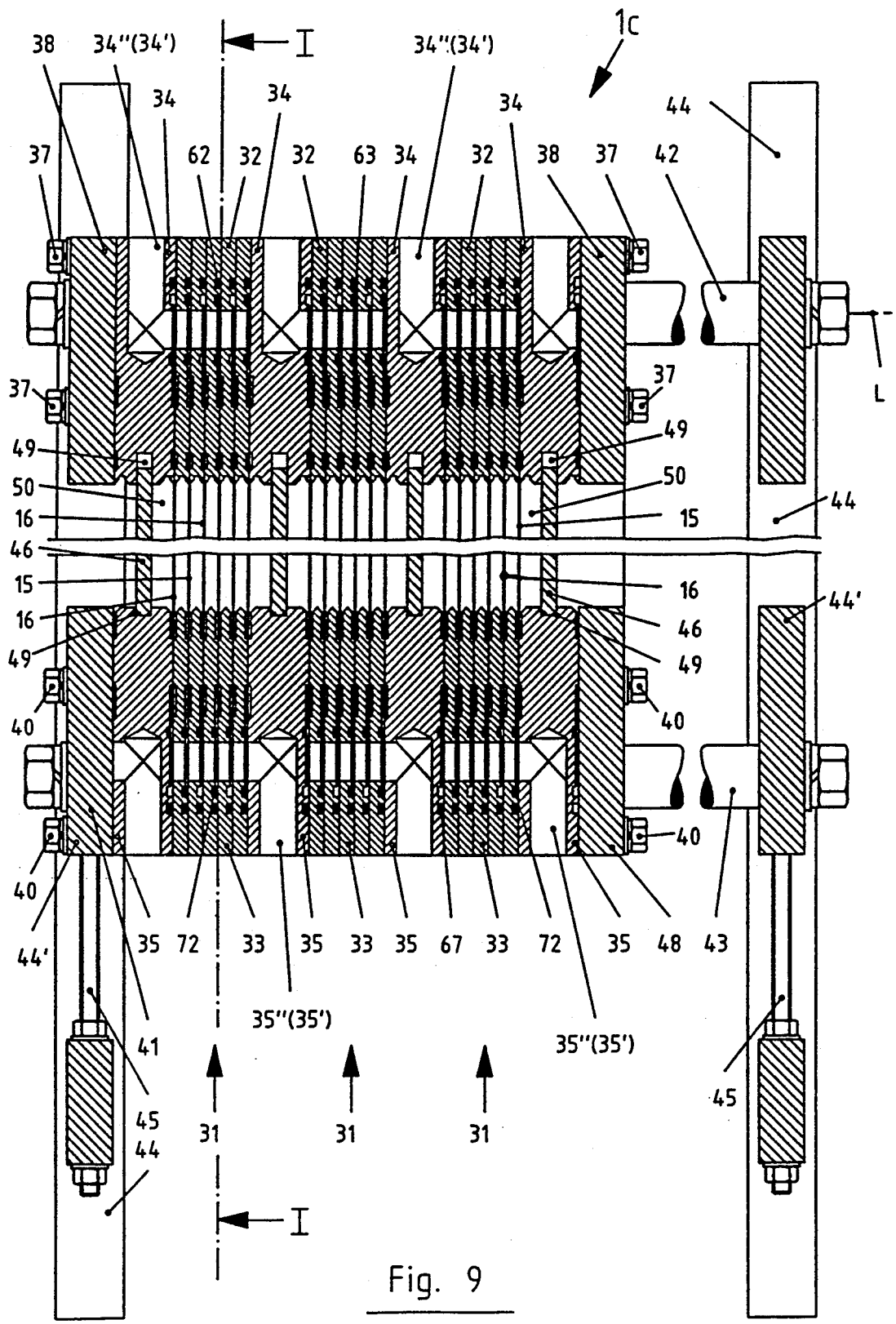
Figure 10:
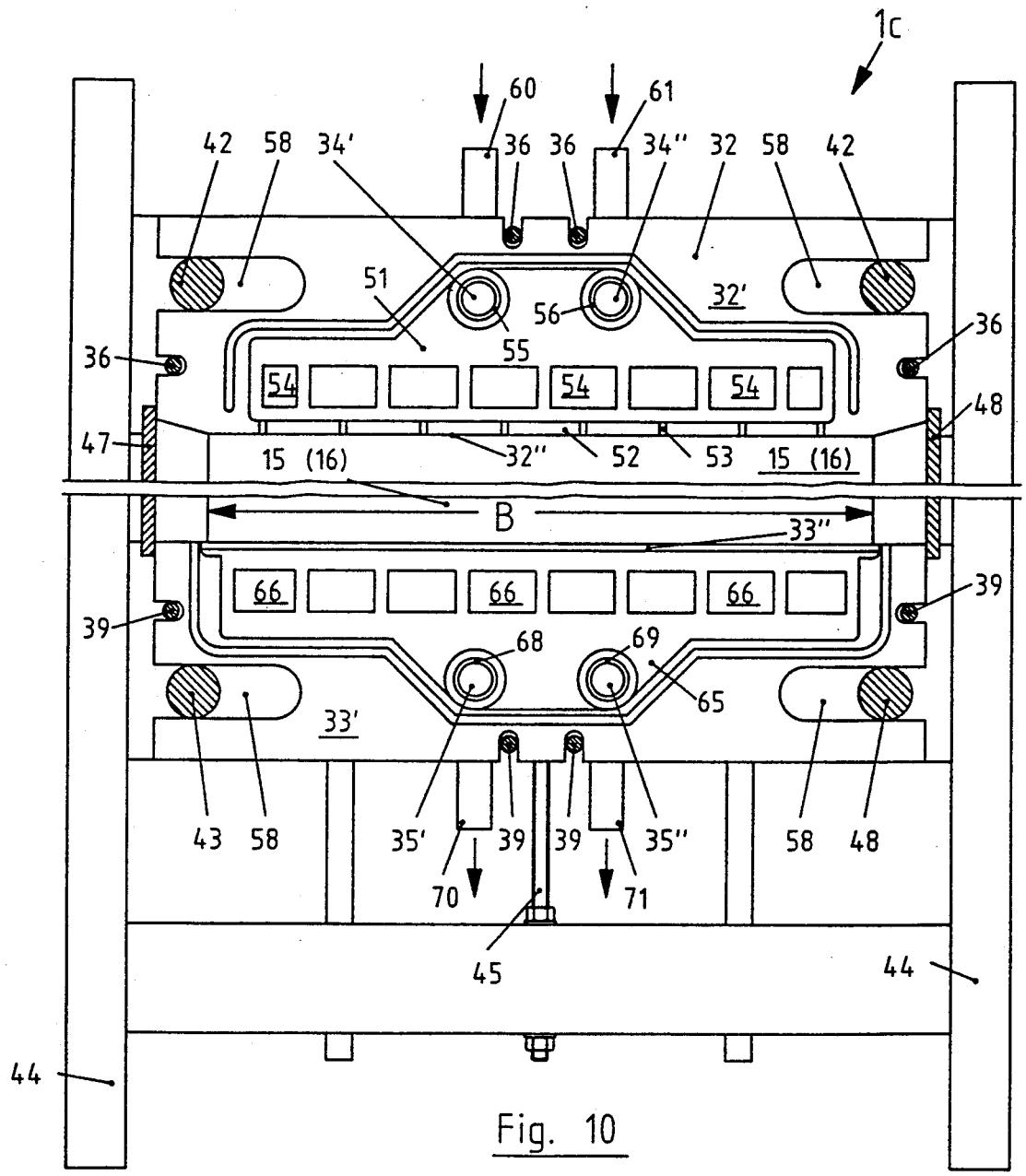
Figures 12, 14:
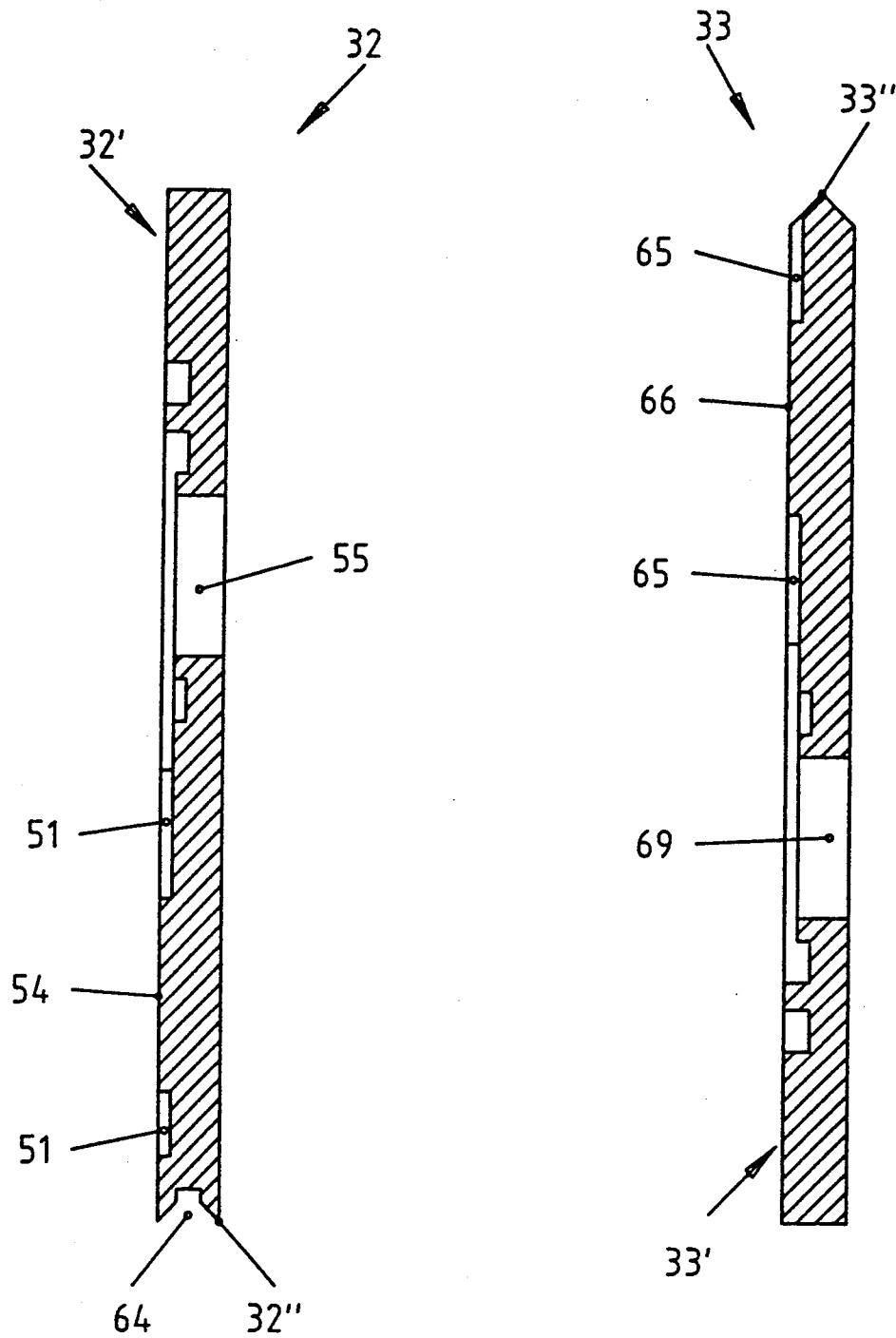
Figure 11:
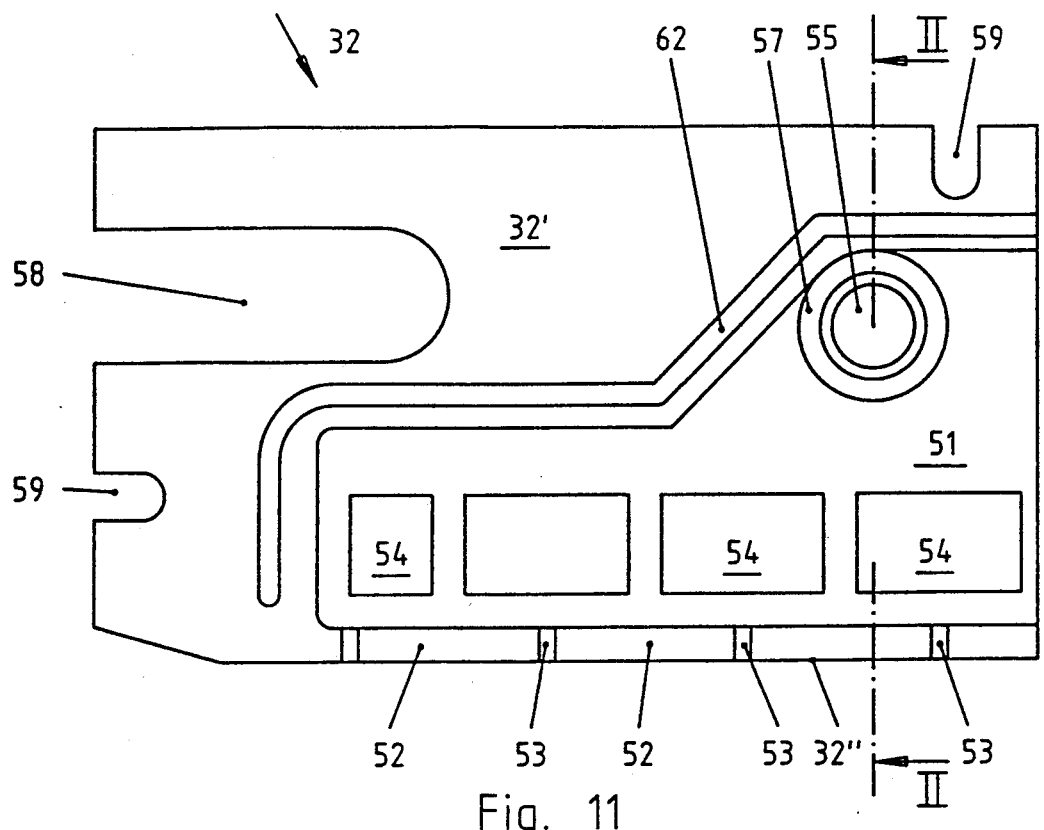
Figure 13:
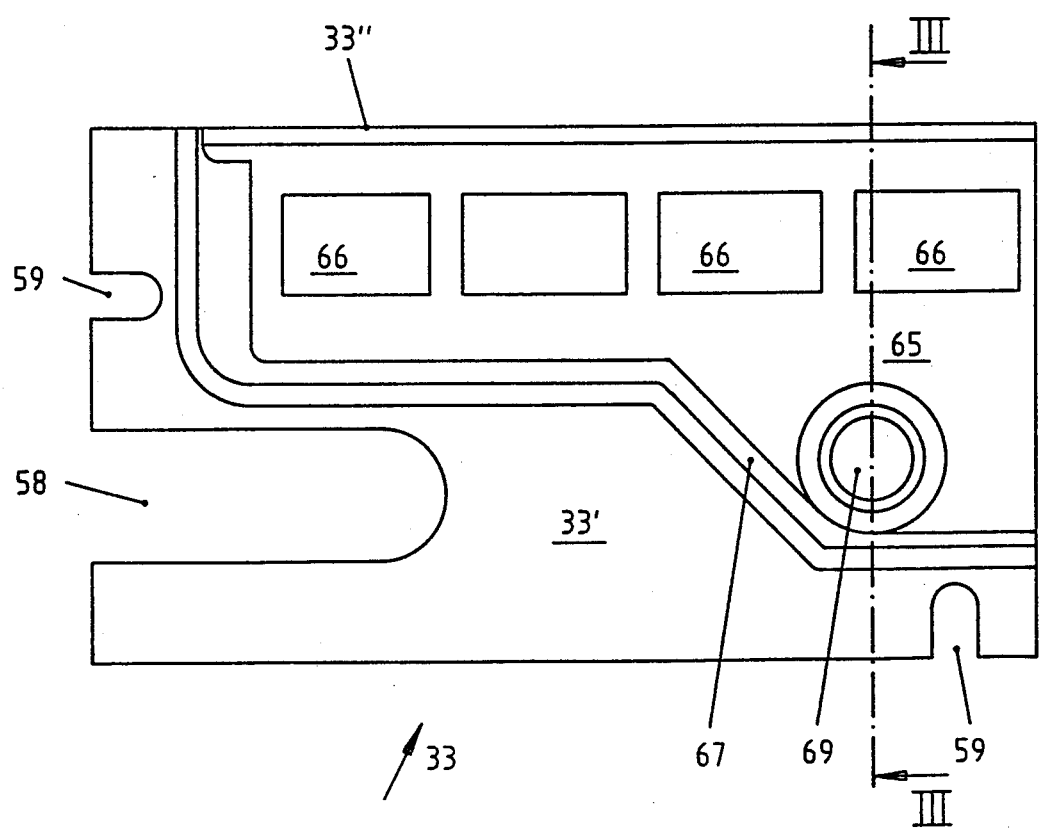

The invention is described in detail below with the aid of figures of examples relating to the recovery of potable water from sea water and wherein FIG. 1 shows, in the block diagram, a device pursuant to the invention containing a system for the recovery of potable water from sea water wherein only the channels for liquid to be processed are shown; as shown in the following FIG. 2, the channels for recovering the processed water are directly underneath the channels for liquid to be processed;

FIG. 2, in simplified representation and in section, a portion of the evaporation and condensation arrangement of the device;

FIG. 3, in top view, a partial length of the upper delivery and distribution channel for the liquid to be processed (sea water) or for the condensate;

FIG. 4, a partial length of the upper delivery and distribution channel for the liquid to be processed or for the condensate in side view, together with a flow aid of hydrophilic material extending away along the underside of the channel;

FIG. 5, in simplified representation and in cross section, the upper delivery and distribution channel for the liquid to be processed and/or for the condensate in an additional embodiment of the invention;

FIGS. 6 and 7, in schematic representation and in top view, two more embodiments of the device pursuant to the invention;

FIG. 8, in schematic representation, a plurality of devices succeeding one another cascadelike and forming a complete system or device;

FIG. 9, in longitudinal and vertical section, another preferred embodiment of a multi-stage device pursuant to the invention;

FIG. 10, a section along line I—I of FIG. 9;

FIG. 11, one half of an upper plate of the device of FIG. 9;

FIG. 12, a section along line II—II of FIG. 11;

FIG. 13, in a representation similar to that of FIG. 11, a bottom plate of the device of FIG. 9;

FIG. 14, a section along line III—III of FIG. 13.

FIG. 1 shows a system for the desalination of sea water, i.e., for the recovery of water for domestic use or potable water from sea water. The heart of this system is an evaporating and condensing device 1, which in the interior 2 of a closed and preferably thermally insulated housing 3 has a plurality of upper channels 4 and 5 and lower channels 6 and 7, extending parallel to one another and in horizontal direction. With regard to their profile, all channels 4-7 are in each instance designed alike, i.e., they each consist of a length of a U profile open toward the top with two arms 8 arranged parallel to one another and extending in vertical planes, and of a horizontal yoking surface 9 connecting these arms together. The profile forming the channels 4-7 is made, in one piece with the arms 8 and the yoking surface 9, of a corrosion-resistant material, for example of a synthetic material. Despite their like profile, the channels 4 and 5 or 6 and 7 have unlike functions, i.e., the channels 4 act as delivery and distribution channels for the liquid to be processed, i.e., for the sea water to be desalinated, and the channels 5 as delivery and distribution channels for the condensate recovered from the liquid to be processed. The channels 4 and 5 are in each instance provided alternately and closely adjacent parallel to one another on essentially the same horizontal level, specifically, so that, perpendicular to the longitudinal extension of these channels, a channel 5 is provided on both sides of each channel 4.

In vertical direction under each channel 4 there is provided a channel 6, which serves as a collecting and delivery channel for the liquid to be processed. In addition, in vertical direction under each channel 5 there is provided a channel 7, which serves for collecting and carrying off the condensate. The channels 6 and 7, of which each channel 6 is in each instance again surrounded on either side by a channel 7, are likewise located on the same horizontal level in the embodiment illustrated.

A distributor 4' connects all channels 4 at their one end with an inlet 10 for the liquid to be processed (sea water inlet). At their other end all channels 4 are connected to an overflow, not illustrated in detail, which for its part is in communication with an outlet 11 for the liquid to be processed (sea water outlet). This overflow is designed weirlike so that in the channels 4 a liquid level is produced at a predetermined level N4 and excess liquid flows off through this overflow.

All the channels 6 assigned to the channels 4 are likewise connected, via a distributor 6', at their one end to the outlet 11. In the embodiment illustrated, the distributor 6' is located at the end of the channels 6 lying remote from the distributor 4', in other words, where the aforementioned overflow for the channels 4 is likewise provided.

All channels 5 are connected, via a distributor 5', by one end to an inlet 12 for the condensate (condensate inlet). In the embodiment illustrated, the distributor 5' is located at that end of the channels 5 where the distributor 4' is likewise provided. At the other end of the channels 5 there is provided an overflow by way of which these channels are in communication with the outlet 13 for the condensate (condensate outlet). This overflow, not illustrated, is likewise designed weir like so that a liquid level for the condensate is produced at the level N5 in the channels 5 and only when this level is reached does excess condensate pass through the overflow to the outlet 13. All channels 7 are likewise connected, via a distributor 7', to the outlet 13. It is understood that the aforementioned connections are designed so that the liquid to be processed, i.e., the sea water, cannot get directly into the circuit of the condensate.

The channels 4 and 5 are provided, along a center line in the center of their floor formed by the respective yoking surface 9, with a plurality of continuous openings 14, specifically at a predetermined distance apart. In the region of these series of holes, formed by the holes 14 and in each instance extending in the longitudinal direction of each channel 4 and 5, there is attached in suitable fashion to the underside of the yoking surface 9 of each channel, in the region of its upper horizontal longitudinal edge, a curtainlike flow aid 15 or 16, specifically, a flow aid 15 at each channel 4 and a flow aid 16 at a channel 5. The flow aids 15 and 16 run downward curtainlike and in each instance their lower horizontal edge reaches into the associated lower channel 6 and 7 respectively. Suitable weights 17, provided at the lower edge, and/or spring loads hold the flow aids 15 and 16 tensioned, specifically, so that a flow aid 16 is arranged at both sides of each flow aid 15, specifically at as short as possible a distance from the flow aid 15, but without contacting the latter. In the longitudinal direction of the channels 5-7 the flow aids 15 and 16 may in each instance be designed continuous. However, a plurality of curtainlike or flaplike flow aids adjoining one another in the longitudinal direction of the channels may alternatively be employed.

The sea water to be processed is taken in through a sea water line 18 by means of the pump 19 and delivered via a heat exchanger 20 to a heating means 21, in which the sea water is heated to a temperature which, however, is under the boiling point at normal atmospheric pressure. The heating means 21 may be designed in a wide variety of ways. It may, for example, be operated by electric current or fossil fuels. In addition, the heating means 21 may alternatively be one which effects the heating of sea water with the use of solar energy. The latter is the case especially when the system is to be employed in geographical regions in which sufficient solar energy or solar radiation is ensured. The sea water heated by the heating means 21 reaches the inlet 10 of the device 1.

The outlet 11 is connected to a pipeline 22 which carries off the sea water. In this connection, two modes of operation are possible:

In a first possible mode of operation, the sea water is conducted via the pipeline 22 from the outlet 11 directly into the sea.

In a second mode of operation, part of the sea water is carried back from the outlet 11 to the inlet 10 and, in doing so, is mixed with fresh sea water. In this case the quantity of sea water delivered is smaller than in the first mode of operation. Therefore the advantage of this second mode of operation is, inter alia, that less supplied sea water needs to be filtered and/or processed and that the pumping capacity or work required is less.

To collect the water for domestic use or potable water recovered by the system there is provided a tank 23, whose inlet 24 is connected via the heat exchanger 20 with the potable water outlet 13. The domestic or potable water supply, not illustrated in detail, is then connected to the tank 23. The tank 23 in addition has an auxiliary outlet 25, which leads via an auxiliary pump 26 and a cooling means or a cooler 28 to the domestic water inlet 12.

Operation of the system or the device 1 may be described as follows:

The channels 5 are supplied, via the auxiliary pump 26, the cooler 28, the inlet 12 and the distributor 5', with the condensate or with domestic water from the tank 23, which (domestic water) is cooled in the cooler 28. The condensate or domestic water thus cooled passes through the openings 14 of the channels 5, flows downward on the flow aids 16 and, in doing so, forms a condensate flow, extending downward curtainlike, in which the condensate or its liquid surface lies completely free and is not covered by a wall or the like. The condensate which has flowed downward on the flow aids 16 is collected by the channels 7 and conveyed, via the outlet 13 and the heat exchanger 20, back to the tank 23, specifically, together with any condensate from the overflow of the channels 5.

The sea water heated in the heating means 21 reaches the channels 4 via the inlet 10 and the distributor 4' and flows, through the openings 14 there, downward on the flow aid 15. A major part of the water portion of the sea water vaporizes or evaporates and the resultant steam condenses upon striking the substantially cooler condensate flowing downward on the flow aid 16. The evaporated and condensed water portion of the sea water flowing downward on the flow aid 15 is conveyed, via the channels 7 and the outlet 13, with the remaining condensate to the tank 23.

An essential advantage of the device or the evaporating and condensing arrangement formed of the channels 4-7 and the associated flow aids 15 and 16 consists in that evaporation or vaporization and condensation take place in the immediate spatial vicinity and, due merely to this, a high efficiency is obtained with a simplified and compact design of the device 1. Efficiency is increased especially because the condensation of water vapor is effected directly on the cooler condensate and not, perhaps, on surfaces of the device. This type of condensation, however, likewise contributes to the simplification of construction and ensures that corrosion and fouling where the condensate is formed cannot occur. The flow aids 15 and 16 consist, for example, of a woven cloth, a nonwoven or similar hydrophilic material which may be made with the use of natural or synthetic materials. Blanks of a screenlike material of metal and/or synthetic material, for example, are alternatively suitable as flow aids 15 and 16. The particular material used for the flow aids 15 and 16 should be selected as hydrophilic material so that in this material a distribution of the liquid emerging through the openings 14 of the channels 4 or 5 takes place in the longitudinal direction of the channel and a flow of liquid with a free liquid surface is produced on both sides of the respective flow aid 15 or 16.

FIG. 5 shows, in cross section, a channel 27 which is formed of a V profile open toward the top and may be used, for example, instead of the channels 4 and/or 5. The channel 27 is again made of a length of a suitable profile of a corrosion-resistant material. At its underside, i.e., in the region of the lowest point of the cross section, the channel 27, insofar as it has the function of the channels 4 or 5, is provided with the openings 14. The flow aid 15 or 16 is then again attached there by its upper horizontal edge. The V-shaped profile cross section of the channel 27 is of advantage, for example, when this channel is used instead of the channels 5. The V-profile shape then causes even condensate which has been deposited on the outer surface of the channel 27 to be conveyed downward on the flow aid 16.

The invention has been described above by way of one example. It is understood that numerous modifications and variations are possible without thereby abandoning the inventive idea underlying the invention.

It has been assumed in the embodiment illustrated that the upper delivery and distribution channels, as well as the lower collecting and removal channels are elongated rectilinear channels, where a flow region in each instance formed by the channels 4 and 6 and the flow aid 15 is arranged for the liquid to be processed in the longitudinal direction of the channel between two flow regions in each instance formed of the channels 5 and 7 and the flow aid 16. However, other structures are alternatively conceivable, for example, such that in each instance a flow region for the liquid to be processed is surrounded annularly by a flow region for the condensate.

In addition, it is in principle alternatively possible to provide at least the flow aids 15 for the liquid to be processed in a plane slightly inclined toward the vertical, so as to promote the emergence of water vapor by driveup on the surface side of these flow aids, directed upward owing to the inclination.

In the embodiment described in the figures the channels 5-7 or 27 are in each instance separate elements which are arranged and held in the housing 3 by means of suitable holding devices or elements. In principle, it is alternatively possible to make the upper and/or lower channels in one piece with one another or with corresponding elements of the device 1 or the housing 3.

FIG. 6 shows, in schematic representation, a device 1a, wherein instead of the flow aids 15 and 16 of sheetlike or flat material, strandlike flow aids 15a and 16a are used, which extend in vertical direction, i.e., perpendicular to the plane of the drawing of FIG. 6, and consist, for example, of fibers or hollow fibers. However, the flow aids 15a and 16a may alternatively be made of rod-shaped elements of hydrophilic material. There the arrangement is made so that each flow aid 15a for the liquid to be treated is surrounded by a plurality of flow aids 16a for the condensate, where it is preferable for delivery and removal of the liquids to arrange the flow aids 15a and 16a according to FIG. 6 in a plurality of rows designated there by A and B. Then each row A is formed of the flow aids 16a and each row B of the flow aids 15a. The flow aids 15a in the rows B are in each instance staggered, in the longitudinal direction of the rows, by one-half the distance apart of two flow aids with respect to the flow aids 16a of the adjacent rows A and, in addition, each row B is formed between two rows A.

FIG. 7 shows a device 1b, wherein two flow aids 15b and 16b are used, which in each instance consist of sheet material and run spirally about an imaginary vertical axis. The flow aid 15b is provided for the liquid to be treated and the flow aid 16b is provided for the colder condensate. In the device 1b a plurality of such arrangements, formed of the flow aids 15b and 16b, may of course alternatively be provided in a common working space.

To increase efficiency, it is alternatively possible to act on the interior space of the respective device 1, 1a and 1b, i.e., for example, the interior 3 of the device 1, with a negative pressure, so as to promote the emergence of water vapor on the flow aids 15, 15a, 15b or on the channels 29 conveying the liquid to be processed.

In addition, it is alternatively possible to produce a flow of gas and air in the respective housing or working space of the device by, for example, circulation, in such a way that at the flow regions formed of the liquid to be treated or processed the boundary layer of evaporated liquid there is carried off rapidly and/or the evaporated liquid is rapidly transported to the flow region of the cooler condensate forming the condensing surface.

As illustrated in FIG. 8, it may be expedient, alternatively especially in plants for the processing of water, to provide a plurality of devices, for example, devices 1, cascadelike, i.e., as a series of n such devices, such that all devices 1 are in each instance traversed by the liquid to be processed, delivered at 29, as well as by the processed liquid removed at 30. Then the direction in which the processed liquid flows successively through the individual devices 1 is opposite to the direction in which the individual devices 1 are traversed by the liquid to be processed. The liquid to be processed then flows, for example, from the device of number (1) to the device of number (2), etc., to the device of number (n), while the processed liquid or the condensate flows from the device of number (n) to the device of number (n−1), etc. This design results in a substantial improvement in the utilization of energy or energy balance and particularly of the energy coefficient as well, which represents the quotient of the energy required and the external energy to be supplied. Here the energy required is particularly that energy which is required as a total for processing or evaporation of the liquid to be processed and/or cooling of the processed liquid. Since the liquid to be processed is cooled down in flowing through the devices 1 following one another cascadelike or, vice versa, the processed liquid heats up on flowing through the individual devices, the aforesaid direction of flow (counterflow principle) for the liquid to be processed and the processed liquid ensures that, within each device or within each working space, a sufficient temperature difference exists between the liquid to be processed and the processed liquid without additional external energy needing to be supplied. Instead of individual devices 1, successive stages of a single device may alternatively be provided for the cascadelike design.

FIGS. 9 to 14 relate to a preferred embodiment of the invention, i.e., to a device 1c, having a plurality of stages 31 separated from one another and following one another on a longitudinal axis L. In the working space of each stage a plurality of flow aids 15 for the liquid to be processed (sea water), made of a blank of a flat material (fibrous web or non-woven material), as well as corresponding flow aids 16 for the processed liquid (condensate) are in each instance alternately provided in parallel vertical planes perpendicular to the longitudinal axis L. The flow aids 15 and 16 alternate in the direction of the longitudinal axis L. The flow aids 15 and 16 are in each instance clamped between upper plates 32 and lower plates 33. The plates 32 serve to deliver and distribute the respective liquid onto the total width B, which has the respective flow aid 15 or 16 perpendicular to the plane of the drawing of FIG. 9. All plates 32 are designed identical.

The lower plates 33 serve to capture or collect the liquid of the respective flow aid 15 or 16, as well as to carry off this liquid. All plates 33 are designed identical.

The plates 32 and 33, which in each instance are arranged in vertical planes perpendicular to the longitudinal axis L and of which a plate 32 in each instance lies in a common vertical plane with a plate 33, are provided within a stage 31 between two connecting plates 34 and 35, which in each instance are greater in thickness than the plates 32 and 33. The package of plates formed by the upper plates 32 and the upper connecting plates 34 is fastened, with the use of tension bolts 36 with nuts 37, between two outer connecting plates 38, so that each flow aid 15 or 16 is clamped at its upper horizontal edge region between two plates 32.

In like fashion, the package of plates formed by the plates 33 and the lower connecting plates 35 is fastened by means of tension bolts 39, which extend in the direction of the longitudinal axis L, and with the use of nuts 40, between two outer sealing plates 41, so that each flow aid 15 or 16 is clamped, in the region of its lower horizontal edge region, between two plates 33.

The plates 32, the connecting plates 34 and the sealing plates 41 are in each instance carried on two upper supporting rods 42 extending in the direction of the longitudinal axis L. In like fashion, the plates 33, the connecting plates 36 and the sealing plates 41 are carried on two supporting rods 43. The supporting rods 42 are each firmly attached at either end to a frame 44 of the device. The supporting rods 43 are each attached at either end to a block 44′, which is adjustable on the frame 44 of the device or machine in vertical direction, perpendicular to the longitudinal axis L, as indicated by the double arrow C. This adjustment, which is effected by means, for example, of adjusting spindles 45, is necessary to tension the flow aids 15 and 16 after they are fastened between the plates 32 and 33, so that they run exactly parallel to one another in vertical planes.

A vertical dividing wall 46, lying perpendicular to the longitudinal axis L, is provided between each upper connecting plate 34 and lower connecting plate 35. Each dividing wall 46 extends in horizontal direction at either end to a dividing wall 47 or 48. The two dividing walls 47 and 48 are in turn arranged in vertical direction and extend in the direction of the longitudinal axis L over the entire length of the package of plates formed by the plates 32 and the connecting plates 34 or by the plates 33 and the connecting plates 35. The dividing walls 46 are in each instance held in grooves 49 of the connecting plates 34 and 35. The dividing walls 47 and 48 are in each instance attached to the machine frame 44. The dividing walls 46, 47 and 48 form a closed working space 50 for each stage 31, in which space the flow aids 15 and 16 are provided unrestrained.

In order for the plates 32 to be able to perform the function of distribution, i.e., of the channels 4 and 5, each plate 32, designed essentially rectangular, has on its face 32′ a depression 51, which is delimited towards all sides of the plate 33, specifically including towards the lower long side 32″, by a crosspiece 52, which, however, is interrupted by a plurality of grooves 53. A number of projections 54 are provided within the depression. In addition, in the region of the depression 51 each plate 32 has two holes 55 and 56, which are in each instance surrounded by an annular recess 57. As FIG. 12 shows, each projection 54 forms a surface which lies in a plane with the surface of the face 32′ (outside the depression 51). In addition, each recess 57 is formed somewhat deeper in the plate 32 than the depression 51. The surface of the crosspiece 52 of course likewise lies in the plane of the surface of the face 32′.

Each plate 32 further has two recesses 58 for the supporting rods 42 and four recesses 59 for the tension bolts 36. In the as-built state all plates 32 lie congruent or equiaxial with their holes 55 and their holes 56, specifically, with one another as well as with openings of channels 34' and 34'', which are each provided in a connecting plate 34. Thus the holes 55 of all plates 32 of a stage 31 lie congruent with an opening of a channel 34' in a connecting plate 34, which (channel) is provided for the delivery of sea water. The holes 55 of the plates 32 of each stage 31 lie congruent with an opening of a channel 34'', which is provided in the corresponding connecting plate 34 for the delivery of processed water (condensate). In each stage 31 the sea water is delivered via a pump and a line 60 to the channel 34' in the corresponding connecting plate 34. In similar fashion, delivery of the processed water (condensate) is effected via a pump and a line 61 to the channel 34'' in the corresponding connecting plate 34. The plates 32 lie sealingly against one another or sealingly against the connecting plates 34 with the aid of seals 62. All plates 32 are oriented with their face 32' in the same direction.

The depression 51 of each plate forms a distribution chamber, which is closed off by a flat surface of an adjacent plate 32 or 34 and to which the sea water and the processed water (condensate) are delivered via the channel formed by the holes 55 and 56, respectively.

To separate the sea water from the processed water (condensate), i.e., to ensure that the chamber formed by the depression 51 of a plate 32 is supplied only with sea water and the chamber formed by the depression 51 of an adjacent plate 32 is supplied only with processed water, sealing rings 63 surrounding the holes 55 or 56 are alternately provided on the plates 32. Wherever the chamber formed by the depression 51 of a plate 32 serves for the accommodation of sea water, the sealing ring 63 is located at the hole 56 and there prevents entry of the processed water into this chamber. Where the chamber formed by the depression 51 serves for the accommodation of processed water, a sealing ring 63 is provided at the hole 55 and there prevents entry of sea water into this chamber. The projections 54 serve to fasten the flow aids 15 and 16.

The liquid found in the chamber formed by the respective depression 51 flows downward through openings formed by the grooves 53 and is distributed onto the respective flow aid 15 or 16 across the total width B.

To prevent liquid at the lower longitudinal edge 32' from reaching the back of the respective plate 32 from the face 32' and thus resulting in an undesirable mixing of processed liquid and liquid to be processed, each plate 32 is provided at the longitudinal side 32'' with a continuous groove 64.

The plates 33 are designed virtually identical with the plates 32, i.e., each plate 33 has at its face 33' a recess 65 corresponding to a recess 51, which, however, is open towards the upper longitudinal side 33''. The recess 65 is provided with the projections 66 corresponding to the projections 54. In addition, each plate 33 has a seal 67 corresponding to the seal 62, two holes 68 and 69 within the recess 65 and the recesses 58 and 59 for the supporting rods 43 or tension bolts 39. The face 33' of the plates 33, which have the same thickness as the plates 32, are again oriented in the same direction.

In each stage 31 the plates 33 lie with their holes 68 congruent as well as equiaxial to one another and to an opening of a channel 35' provided in a connecting plate 35, which channel serves to carry off the sea water and is connected with a corresponding line 70. The holes 69 lie congruent and equiaxial to one another and to an opening of a channel 35'' provided in the connecting plate 35, which channel serves to carry off the processed water (condensate) and is connected with a corresponding outside line 71. Here again, to obtain a separation of sea water and processed water, sealing rings 72 are alternately provided at the holes 68 and 69, specifically, a sealing ring 72 at a hole 68 wherever the plate 32 arranged thereon has a sealing ring 63 at the hole 55, i.e., the chamber formed by the recess 65 serves for collecting the processed water. A sealing ring 72 surrounding the hole 69 is always provided wherever the overlying plate 32 on the hole 56 has a sealing ring 63, i.e., the chamber formed by the recess 65 serves to collect and carry off the sea water. To ensure a positive separation of the media (sea water and processed water) on the upper longitudinal side 33'', each plate 33 there is designed titled (FIG. 14).

The platelike design of the device 1c described makes it possible, using like parts, to select the size of the device, i.e., in particular the number and/or size of the stages 31, in accordance with the particular application.

The individual stages 31 of the device 1c preferably form a cascade, i.e., are preferably operated in the way described in connection with FIG. 8 for the devices 1.

The plates 32, 33, 34 and 35 are preferably made of synthetic material and the sealing plates 38 and 41 are preferably made of steel.

In all embodiments described, heating of the processed liquid (sea water) is preferably effected in a heat exchanger, to which the necessary thermal energy is supplied via a heat-transfer medium, for example, water with no or low salt content. This has advantages, particularly in the processing of sea water.

Although the recovery of domestic or potable water from sea water or salt water represents a preferred area of application of the invention, the latter may alternatively be employed for other purposes where evaporation and subsequent condensation are used to obtain an end product in the form of a condensate from a liquid to be processed.

In the device according to the invention, part of the thermal energy of the processed liquid preferably is conveyed, via at least one heat exchanger, to the liquid to be processed, so as to further reduce the need to supply external energy.

We claim:

1. Distillation device for purification of water by evaporating water to be treated and by condensing purified water, said device comprising:

first and second distributing and guide means vertically disposed in at least one chamber;

said distributing and guide means consisting of sheets of a wettable material in a form selected from the group consisting of woven cloth and fibrous nonwoven material, said sheets being capable of carrying a film of water on surface sides and forming flow regions;

said distributing and guide means being disposed in said chamber such that at least one flow region of a first distributing and guide means is neighbored to at least one flow region of a second distributing and guide means;

means for developing a flow of said water to be treated along said flow region of said first distributing and guide means;

means for developing a flow of purified water on the flow region of said second distributing and guide means; and means for controlling the temperature of the flow of water so that the flow of water on the second distributing and guide means is cooler in temperature than the flow of water to be treated on the first distributing and guide means.

2. The device of claim 1 wherein said distributing and guide means are arranged in a vertical plane.

3. The device of claim 1 wherein there are a plurality of said first and second distributing and guide means and wherein each flow region of a first distributing and guide means is adjacent to at least one flow region of a second distributing and guide means.

4. Distillation device for purification of water by evaporating water to be treated and by condensing purified water, said device comprising:

first and second distributing and guide means vertically disposed in at least one chamber;

said distributing and guide means consisting of sheets of a wettable material in a form selected from the group consisting of woven cloth and fibrous non-woven material, said sheets being capable of carrying a film of water on surface sides and forming flow regions;

said distributing and guide means being disposed in said chamber such that at least one flow region of a first distributing and guide means is neighbored to at least one flow region of a second distributing and guide means;

means for developing a flow of said water to be treated along said flow region of said first distributing and guide means;

means for developing a flow of purified water on the flow region of said second distributing and guide means;

means for controlling the temperature of the flow of water so that the flow of water on the second distrubuting and guide means is cooler in temperature than the flow of water to be treated on the first distributing and guide means;

each sheet of wettable material being fastened on its upper and lower ends by being clamped between upper and lower pairs of plates;

said means for developing said flow of said water to be treated along said first distributing and guide means and said means for developing said flow of purified water along said second distributing and guide means comprising an upper distributing chamber for distributing the water across said first and second distributing and guide means and a lower collecting chamber for collecting the water from said first and second distributing and guide means and for carrying off the water from said guide means;

each said distributing chamber and each said collecting chamber being formed between the plates of each upper and lower plate pair.

5. The device of claim 4 wherein the upper and lower plates are in each instance arranged in a vertical plane.

6. The device of claim 4 wherein the upper and lower plates form a stack of plates and wherein means are provided for pressing together and supporting the plates of each stack.

7. The device of claim 4 wherein the means for controlling the temperature of the flow of water comprises means for heating the water to be treated.

8. The device of claim 4 wherein the means for controlling the temperature of the flow of water comprises means for cooling the purified water.

9. Distillation device for purification of water by evaporating water to be treated and by condensing purified water, said device comprising:

first and second distributing and guide means vertically disposed in at least one chamber;

said distributing and guide means being formed by sheets of a wettable flat material and being adapted to carry a film of water on surface sides and to form flow regions;

said distributing and guide means being disposed in said chamber such that at least one flow region of a first distributing and guide means is neighbored to at least one flow region of a second distributing and guide means;

means for developing a flow of said water to be treated along said flow region of said first distributing and guide means;

means for developing a flow of purified water on the flow region of said second distributing and guide means;

means for controlling the temperature of the flow of water so that the flow of water on the second distributing and guide means is cooler in temperature than the flow of water to be treated on the first distributing and guide means;

each sheet of wettable material being fastened on its upper and lower end between upper and lower pairs of plates;

said means for developing said flow of said water to be treated along said first distributing and guide means and said means for developing said flow of purified water along said second distributing and guide means comprising an upper distributing chamber for distributing the water across said first and second distributing and guide means and a lower collecting chamber for collecting the water from said first and second distributing and guide means and for carrying off the water from said guide means;

each said distributing chamber and each said collecting chamber being formed between the plates of each upper and lower plate pair;

said upper and lower plates each having at least two holes, of which first holes in the upper plates form a channel intersecting the distributing chambers for delivery of said water to be treated and second holes form a channel intersecting said chambers for delivery of the purified water, and of which first holes in the lower plates form a channel intersecting said collecting chambers for carrying off said water to be treated and second holes form a channel intersecting said collecting chambers for carrying off the purified water;

at said at least one first flow region for said water to be treated the second hole in the respective upper plate and the second hole in the respective lower plate being closed off by seals from the distributing chamber and the collection chamber respectively; and at said at least one second flow region for the purified water the first holes in the upper and lower plates being sealed off by seals from the distributing chamber and the collection chamber respectively.

10. The device of claim 9 wherein the upper and lower plates are in each instance arranged in a vertical plane.

11. The device of claim 9 wherein the upper and lower plates form a stack of plates, and wherein means are provided for pressing together and supporting the plates of each stack.

12. The device of claim 9 wherein the means of controlling the temperature of the flow of water comprises means for heating the water to be treated.

13. The device of claim 9 wherein the means of controlling the temperature of the flow of water comprises means for cooling the purified water.

14. The device of claim 9 wherein each seal is a sealing ring.

15. Distillation device for purification of water by evaporating water to be treated and by condensing purified water, said device comprising:

a plurality of chambers and first and second distributing and guide means vertically disposed in each of said chambers;

said distributing and guide means being formed by sheets of a wettable material in a form selected from the group consisting of woven cloth and fibrous nonwoven material, said sheets being capable of carrying a film of water on surface sides and forming flow regions;

said distributing and guide means being disposed in said chambers such that at least one flow region of a first distributing and guide means is neighbored to at least one flow region of a second distributing and guide means;

means for developing a flow of said water to be treated along said flow region of said first distributing and guide means;

means for developing a flow of purified water on the flow region of said second distributing and guide means;

means for controlling the temperature of the flow of water so that the flow of water on the second distributing and guide means is cooler in temperature than the flow of water to be treated on the first distributing and guide means;

said chambers with said flow regions formed on said first distributing and guide means and with the flow regions formed on said second distributing and guide means following one another in cascade-like manner such that said water to be treated and the purified water flow successively through all chambers in opposed directions;

each sheet of wettable material being fastened at its upper edge between two upper plates and at its lower edge between two lower plates, the upper and lower plates being adjustable relative to one another for tensioning the sheets of wettable material.

16. The device of claim 15 wherein the upper and lower plates are in each instance arranged in a vertical plane.

17. The device of claim 15 wherein the upper and lower plates form a stack of plates and wherein means are provided for pressing together and supporting the plates of each stack.

18. The device of claim 15 wherein the means for controlling the temperature of the flow of water comprises means for heating the water to be treated.

19. The device of claim 15 wherein the means for controlling the temperature of the flow of water comprises means for cooling the purified water.

* * * * *